United States Patent [19]

Knauss

[11] Patent Number: 4,754,119
[45] Date of Patent: Jun. 28, 1988

[54] TEMPERATURE REGULATING DEVICE, PARTICULARLY FOR LIQUIDS OR GASES

[75] Inventor: Hermann Knauss, Oberderdingen, Fed. Rep. of Germany

[73] Assignee: E.G.O. Elektro-Gerate Blanc u. Fischer, Fed. Rep. of Germany

[21] Appl. No.: 855,506

[22] Filed: Apr. 23, 1986

[51] Int. Cl.⁴ ............................................. F27D 11/00
[52] U.S. Cl. .................................. 219/331; 219/282; 219/298; 99/330; 99/331
[58] Field of Search ............... 219/335, 336, 331, 511, 219/523, 280, 281, 282, 292, 298, 323; 337/114, 117, 120; 99/330, 331

[56] References Cited

U.S. PATENT DOCUMENTS

| | | | |
|---|---|---|---|
| 1,930,551 | 10/1933 | Blashfield | 219/19 |
| 3,319,049 | 5/1967 | Wanet | 219/335 X |
| 4,503,320 | 3/1985 | Polster | 219/523 X |

FOREIGN PATENT DOCUMENTS 1917420  6/1965  Fed. Rep. of Germany .
7138400  2/1972  Fed. Rep. of Germany .
2919208  1/1981  Fed. Rep. of Germany .

OTHER PUBLICATIONS

German Search Report Appln. No. P 3500257.3, Mar. 19, 1985.

Primary Examiner—Patrick R. Salce
Assistant Examiner—Emanuel Todd Voeltz
Attorney, Agent, or Firm—Steele, Gould & Fried

[57] ABSTRACT

A temperature regulating device with a hydraulic regulator for medium heating has a sensor tube in a closely surrounding protective jacket, which is connected directly in good heat conducting manner with a separate sensor heating element in the form of a tubular heater. This sensor heating element is located with the sensor tube in the medium to be heated, which is to be heated by a separate heating device located outside the medium. Through the simultaneous operation of this heating device and the sensor heating element, there is a significant reduction in the operating differential of the switching or control member.

16 Claims, 1 Drawing Sheet

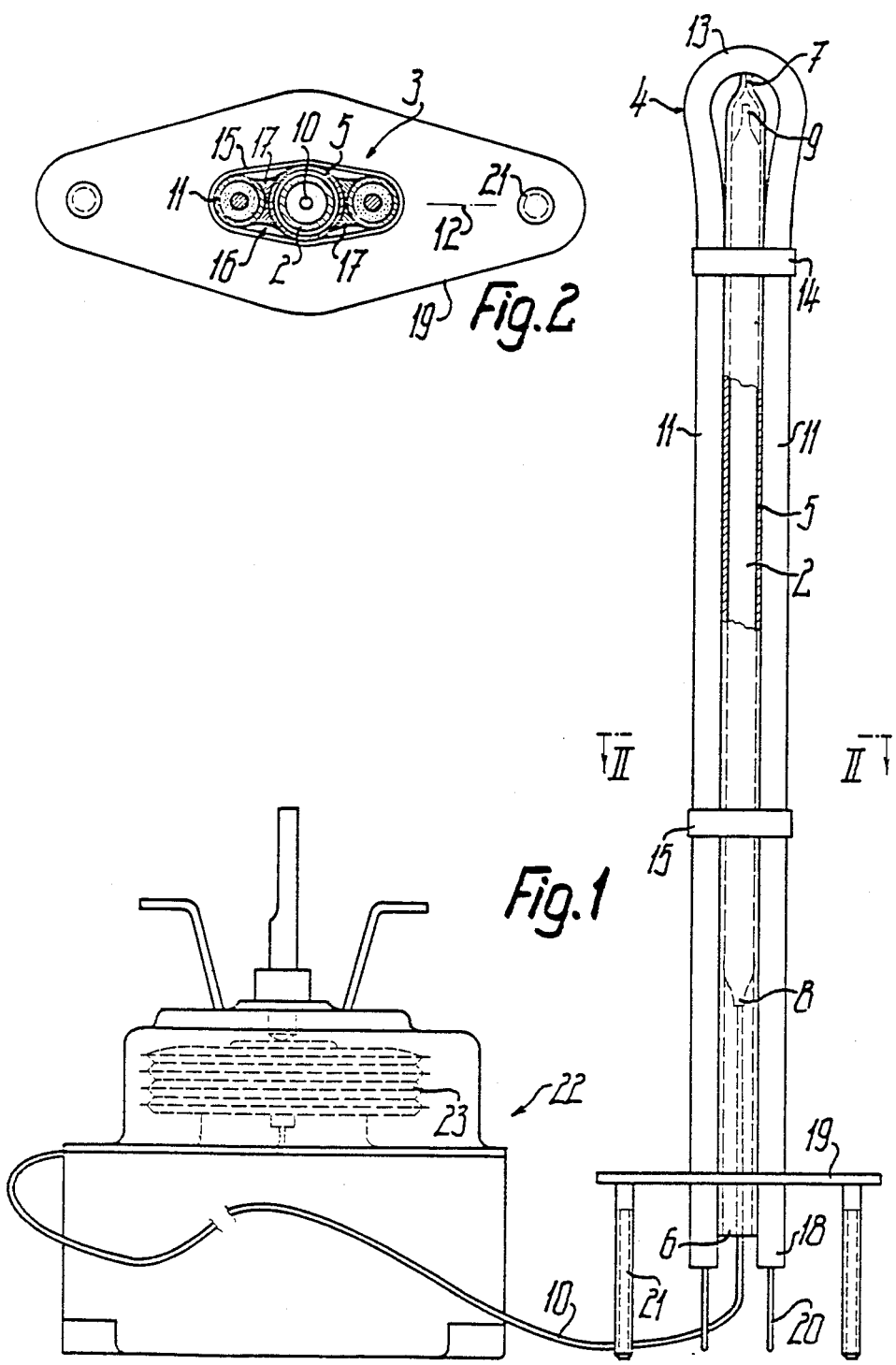

TEMPERATURE REGULATING DEVICE, PARTICULARLY FOR LIQUIDS OR GASES

BACKGROUND OF THE INVENTION

The present invention relates to a temperature regulating device for media heated and/or to be kept at a desired temperature by intermittent, thermostatically controlled heating and in particular liquids or gases, having a hydraulic regulator for the heating of the medium and connecting to a sensor tube of an expansion system constructed for a flooded arrangement in the medium and arranged separately from the heating device forming the medium heating system.

In the heating of media, particularly temperature sensitive gases or liquids, such as frying fat or hot water, which must be accurately thermostatically controlled, etc, it is generally difficult to achieve an adequately small operating differential, i.e. control the heating in such a way that the lowest and highest temperature values of the medium are as close together as possible. This is particularly difficult if a very high power heating system is used for compensating a high, sudden temperature drop. In such a case, the sensor tube takes the test value of the particular temperature substantially exclusively over the medium to be heated, so that during heating it only generally responds in a delayed manner. Attempts have already been made to reduce these disadvantages by placing the sensor tube as close as possible to the medium heating device, but this can also lead to inaccuracies in control.

SUMMARY OF THE INVENTION

The object of the present invention is to provide a temperature regulating device of the aforementioned type, which makes it possible to obtain in a simple manner a very small control operating differential.

According to the invention this problem is solved by a temperature regulating device of the aforementioned type in that the mounting support for the sensor tube for direct sensor heating is in direct heat conducting connection with at least one sensor heating element separate from the heating device and which, like the sensor tube, is constructed for an arrangement around which the medium flows. Thus, the sensor tube is heated by a sensor heating element which is put into and out of operation at substantially the same time as the heating device, which is substantially exclusively used for the direct heating of the sensor tube and which can have a much lower power level than the heating device, whilst bypassing the medium to be heated, and is cooled to below the switching temperature by the medium until the latter has itself reached the switching or desired temperature. Thus, the control operating differential is bridged in all cases, so that up to switching or operation by the temperature-rising medium only a few degrees differential are necessary. When the medium has reached the desired temperature both the heating device, which can e.g. be formed by a container heating system, and the sensor tube heating element are switched off, so that the sensor tube temperature is very rapidly the same as that of the medium flowing around it. Thus, the control tolerance is once again bridged towards the lower switching or operating point, at which the heating device and sensor heating element are switched on again. If following a corresponding medium temperature drop the heating device is switched on again via the regulating device, then simultaneously the sensor tube heating element is made live, so that the operating differential is then reduced or bridged close to the upper switching or operating point. As a result of such a compensation, the size of the actual difference of the thermostat plays no significant part anymore, because it can be influenced by the dimensioning of the sensor tube heating element.

The construction according to the invention is particularly suitable for the heating of fatty or oily media, e.g. for deep fat fryer heating means. It has been found that without further effort and expenditure it is possible to achieve an operating differential of ±2.5° C. The regulating device according to the invention still operates reliably if the medium introduced into the medium container is initially solid and not liquid e.g. at ambient temperature. In this case, the heating device is initially appropriately only raised to one tenth of full load, the directly heated sensor tube ensuring that the solid fat slowly melts or liquifies and is not locally overheated. If the medium container walls heated from the outside are not sufficiently covered with fat and if therefore the thermal energy is not immediately taken from the walls by the fat, then a further fat temperature regulator directly associated with the heating device, e.g. having its sensor tube in the immediate vicinity of the latter arranged on the outside of the container walls, comes into operation and interrupts the heating power. This ensures that there is no overheating of the fat or oil, so that there is no fire hazzard. This also provides the advantageous possibility that it is possible to add without difficulty both solid fat with a random shape and also liquid fat to the deep fat fryer. However, the construction according to the invention is also suitable for the heating of water, hot air, etc.

According to another feature of the invention the mounting support has a sleeve or jacket, particularly a protective tube at least partly surrounding the sensor tube and whose internal cross-sections in the case of medium-tight reception of the sensor tube are preferably adapted to the external cross-sections of the sensor tube, so that the tubes virtually form a common jacket. Thus, in order to obtain a good heat flow, the sensor tube need not be directly connected to the sensor heating element and there is also no need for the medium to be heated to directly flow around it, there instead being provided a good conducting heat bridge in the form of the mounting support or protective tube between the sensor tube not directly contacting the medium to be heated on the one hand, and the sensor heating element and medium on the other. Thus, according to the invention, the mounting support has a metallic heat conducting bridge between the sensor heating element and the sensor tube, which can in particular be formed by a soldered joint-like alloying of the jacket onto the sensor heating element and/or direct contact between sensor tube and jacket. The heat conducting bridge could also at least partly be formed by direct contact between the sensor tube and the sensor heating element.

In the case of a constructionally and particularly simple embodiment of the invention, the sensor heating element is constructed in a rod-like manner formed by a tubular heater, and/or is substantially parallel to the sensor tube, as well as extending roughly over length thereof.

The heat transfer from the sensor heating element to the sensor tube on the one hand and the simultaneous cooling of the sensor tube by the medium flowing around it on the other, can be further improved in that in different circumferential zones, particularly in the vicinity of two diametrically facing generatrices, the sensor tube is patched by the sensor heating element, which preferably receives the sensor tube between two legs in a U-shape which pass into one another. If the sensor tube is arranged in a jacket, e.g. a protective tube, then the sensor heating element touches the sensor tube in a corresponding manner via said jacket. In the vicinity of two circumferential zones, the sensor tube is directly connected in heat conducting manner to the sensor heating element, whereas the medium to be heated flows directly around it or the jacket in the vicinity of two circumferential zones adjacent thereto and is consequently directly connected in heat conducting manner to said medium.

For the simple fitting and installation of the regulating device, the ends of the sensor heating element and-/or the jacket for the sensor tube are fixed to a flange plate, particularly in such a way that they project in exposed manner therefrom and consequently the surface of the sensor heating element is in contact with the medium to be heated in a direct manner and substantially over its entire extension. Thus, the subassembly formed by the sensor heating element and sensor tube or protective tube is free from further, relatively closed linking coverings, such as e.g. a casing receiving the same, so that this subassembly is directly exposed to the medium flows, e.g. travelling in circular path and produced by the heating system.

BRIEF DESCRIPTION OF THE DRAWINGS

The invention is described in greater detail hereinafter relative to non-limitative embodiments and the attached drawings, wherein show:

FIG. 1, the regulating device according to the invention in elevation.

FIG. 2, a section along line II—II of FIG. 1 on a larger scale.

DETAILED DESCRIPTION OF THE PREFERRED EMBODIMENTS

As can be seen in FIGS. 1 and 2, an inventive regulating device 1 has a through, straight, cylindrical sensor tube 2, a mounting support 3 for sensor tube 2 and a sensor heating element 4 in the shape of a substantially hairpin-like, cylindrical tubular heater, which is operated with electric current.

The mounting support 3 is provided with a jacket 5 in the form of a protective tube surrounding the sensor tube 2 over its entire length and which is cross-sectionally adapted to the latter, i.e. is cylindrical in the present case. The internal cross-sections of jacket 5, matching the substantially constant external cross-sections of the sensor tube 2 over its entire length, are larger than the external cross-sections of tube 2 by such a small amount that in the case of a sliding fit, the clearance of motion necessary for the insertion and removal of sensor tube 2 is provided. Sensor tube 2 is inserted in its longitudinal direction from its open end 6 into jacket 5. The other end 7 of jacket 5 is tightly closed, e.g. by squeezing. Sensor tube 2 extends by its associated inner end approximately up to end 7 of jacket 5. The sensor tube 2 is shorter than the jacket 5, so that the other end 8 of sensor tube 2, to which is connected the associated end of a capillary tube 10 of the expansion system, is spaced from the open end 6 of jacket 5. The diameter of jacket 5 is of the same order of magnitude as the diameter of sensor heating element 4.

Sensor heating element 4 engages linearly on the outer circumference of jacket 5 by its two parallel and substantially continuous, straight legs 11, in such a way that both legs 11 and jacket 5 are in a common axial plane 12. In the vicinity of the transition zone 13 between legs 11 located at end 7 of jacket 5, sensor heating element 4 is either bent in U-shaped manner with a radius of curvature corresponding to one-half the diameter of jacket 5 or, if the smallest permitted bending radius of sensor heating element 4 is larger than this, it is bent with said bending radius. End 7 of jacket 5 can extend up to the curvature inside of transition zone 13. Adjacent to transition zone 13, legs 11 of sensor heating element 4 and jacket 5 are surrounded by a clip 14 made from a thin, sheet metal-like material and are consequently held together in positive manner and are mutually oriented. A further, identical clip 15 is located in the vicinity of sensor tube 2 adjacent to its other end 8.

Sensor tube 2 is connected to sensor heating element 4 over substantially its entire length in continuous manner by a heat conducting bridge 16. A portion of said bridge 16 directly touching sensor tube 2 forms a jacket. A further portion of heat conducting bridge 16 is obtained through the directly contacting engagement of leg 11 of sensor heating element 4 on the outer circumference of jacket 5. To further increase the heat transfer cross-sections between sensor tube 2 and sensor heating element 4, fillet joint-like soldered joints 17 are provided between the legs 11 of sensor heating element 4 and jacket 5. Each soldered joint 17 fills the associated gap between the line, on which the associated leg 11 of sensor heating element 4 contacts the circumference of jacket 5 and the further outward circumferential zones of the particular leg 11 and the jacket 5. The depth of the filled portion of the joint can approximately correspond to half the diameter of sensor heating element 4. The two legs 11 of sensor heating element 4 are consequently joined by four soldered joints to jacket 5. This connection can take place by so-called alloying on, in which the parts to be joined are provided with a pasty solder, which is then liquified by heating in an oven or the like and is intimately connected to the parts to be fixed together. Jacket 5 has exposed circumferential portions adjacent to the soldered joint 17.

The ends 18 of legs 11 of sensor heating element 4, which projects slightly over the associated end 6 of jacket 5 traverse, in the same way as end 6 of jacket 5, in sealing manner a planar flange plate 19, which is at right angles to the central axes thereof. On the outside of flange plate 19, ends 18 of sensor heating element 4 have connecting members 20 for the electrical connection of sensor heating element 4. Flange plate 19 e.g. has two parallel stay bolts 21, which project over the outside thereof and with which the regulating device 1 can be fixed to a container wall in such a way that the flange plate 19 rests on the inside of said container wall and tightly closes the associated opening in said wall. Sensor tube 2 is connected via capillary tube 10 to an adjustable switching or control member 22, which contains an expansion bellows 23 of the expansion system connected to capillary tube 10 and via which both the sensor heating element 4 and the heating device for the medium to be heated are switched on and off.

The sensor means, comprising sensor tube 2 and mounting support 3, is arranged such that the heating element touches the sensor means in different circumferential zones. As shown in the drawings, the heating element can touch the sensor means in the vicinity of two diametrically facing generatrices.

The described heated sensor system makes it possible to significantly reduce the operating differential on the regulator, because said sensor system bridges the actual control operating differential. For example the arrangement can be chosen in such a way that on switching on the heating device for the medium, sensor heating element 4 is simultaneously switched on and consequently the temperature of sensor tube 2 is kept approximately 10° C. higher than the temperature of the medium to be heated. When the desired temperature of the medium is reached, both the heating device and the sensor heating element 4 are switched off and after a very short time sensor tube 2 reaches the temperature of the surrounding medium. This ensures a reliable switching function for constant amplitudes. If in the thermostat there is an operating differential of ±10° C., i.e. 20 degrees K., then the inventive construction makes it possible through the described heating by means of sensor heating element 4 to bring the thermostat to a switching precision of ±1° C.

What is claimed is:

1. A temperature regulating device for a media such as liquids and gases to be heated by intermittent thermostatically controlled heating, said regulating device comprising:
   a medium heating means for heating a medium;
   a hydraulic regulator (22) for controlling the medium heating means;
   a sensor means having a sensor tube (2) of an expansion system, arranged to be immersed in the medium, said sensor means having a mounting support (3) for said sensor tube (2); and,
wherein said sensor means is separate from said medium heating means, and has at least one sensor heating element (4) separate from said medium heating means in direct heat conducting connection with at least one said sensor means, said at least one sensor heating element (4) being immersed in the medium with the sensor means, and providing means for directly heating the sensor means by said sensor heating element (4), said sensor heating element heating the sensor means by substantially bypassing the medium.

2. A regulating device according to claim 1, wherein said mounting support (3) has a jacket (5) at least partly surrounding said sensor tube (2), said jacket (5) being in direct heat conducting connection with said at least one sensor heating element.

3. A regulating device according to claim 2, wherein said jacket received said sensor tube sealingly enclosed against the medium, an internal cross-section of the jacket being closely adapted to an external cross-section of the sensor tube.

4. A regulating device according to claim 2, wherein said jacket is formed by a protective tube.

5. A regulating device according to claim 1, wherein said mounting support has a metallic heat conducting bridge between said sensor heating element and said sensor means.

6. A regulating device according to claim 5, wherein said heat conducting bridge is at least partly formed by soldered joint-like alloying of the jacket onto said sensor heating element.

7. A regulating device according to claim 5, wherein said heat conducting bridge has at least partial direct contact with said sensor tube and said jacket.

8. A regulating device according to claim 1, wherein said sensor heating element has a rod-like construction.

9. A regulating device according to claim 1, wherein said sensor heating element is formed by a tubular heater.

10. A regulating device according to claim 1, wherein said sensor heating element is arranged substantially parallel to said sensor means and extends at least approximately over the length thereof.

11. A regulating device according to claim 1, wherein said sensor heating element touches said sensor means in different circumferential zones.

12. A regulating device according to claim 1, wherein said sensor heating element touches said sensor means in the vicinity of two diametrically facing generatrices.

13. A regulating device according to claim 1, wherein said sensor heating element received said sensor means between two legs connected to one another in a U-shaped manner.

14. A regulating device according to claim 1, wherein ends of said sensor heating element are fixed to a flanged plate and project in exposed manner therefrom.

15. A regulating device according to claim 14, wherein an end of said jacket for said sensor tube is fixed to said flange plate and projects in exposed manner therefrom.

16. A regulating device according to claim 15, wherein said sensor tube and said sensor heating element are fixed to said flange plate.

* * * * *